US012573564B2

(12) United States Patent (10) Patent No.: US 12,573,564 B2
Esaki (45) Date of Patent: Mar. 10, 2026

(54) METHOD FOR MANUFACTURING ELECTRONIC COMPONENT

(71) Applicant: SHOEI CHEMICAL INC., Tokyo (JP)

(72) Inventor: Soichiro Esaki, Tosu (JP)

(73) Assignee: SHOEI CHEMICAL INC., Tokyo (JP)

( * ) Notice: Subject to any disclaimer, the term of this patent is extended or adjusted under 35 U.S.C. 154(b) by 0 days.

(21) Appl. No.: 17/922,577

(22) PCT Filed: Apr. 23, 2021

(86) PCT No.: PCT/JP2021/016513
§ 371 (c)(1),
(2) Date: Oct. 31, 2022

(87) PCT Pub. No.: WO2021/220975
PCT Pub. Date: Nov. 4, 2021

(65) Prior Publication Data
US 2023/0170155 A1 Jun. 1, 2023

(30) Foreign Application Priority Data

May 1, 2020 (JP) ................................ 2020-081191
May 19, 2020 (JP) ................................ 2020-087086

(51) Int. Cl.
*H01G 9/15* (2006.01)
*H01G 9/012* (2006.01)
*H01G 9/042* (2006.01)
(52) U.S. Cl.
CPC .............. *H01G 9/15* (2013.01); *H01G 9/012* (2013.01); *H01G 9/0425* (2013.01)
(58) Field of Classification Search
CPC ...................................................... H01G 9/15
See application file for complete search history.

(56) References Cited

U.S. PATENT DOCUMENTS

2015/0262728 A1* 9/2015 Ogiwara .................. H01B 1/22
252/514
2016/0017185 A1* 1/2016 Albaugh .................. C08K 9/10
252/514
(Continued)

FOREIGN PATENT DOCUMENTS

JP 2000215729 A 8/2000
JP 2005248047 A 9/2005
(Continued)

OTHER PUBLICATIONS

China National Intellectual Property Administration, Office Action and Search Report Issued in Application No. 202180032448.X, Aug. 13, 2024, 13 pages.
(Continued)

*Primary Examiner* — William D Young
(74) *Attorney, Agent, or Firm* — Alleman Hall LLP

(57) ABSTRACT

A method for manufacturing an electronic component includes: a preparation step of preparing an electrode-forming body for electronic components; and an electrode forming step of forming an electrode on an outer surface of the electrode-forming body for electronic components, wherein in the electrode forming step, a conductive resin layer is formed on the electrode-forming body for electronic components by using a conductive resin composition containing a silicone resin. According to the present invention, it is possible to provide a method for manufacturing an electronic component having high moisture resistance. Alternatively, it is possible to provide a method for manufacturing an electronic component having reduced restrictions on design and manufacturing and high manufacturing efficiency, in addition to high moisture resistance.

13 Claims, 2 Drawing Sheets

(56) References Cited

U.S. PATENT DOCUMENTS

| | | | |
|---|---|---|---|
| 2018/0182907 A1* | 6/2018 | Zhang | H01L 31/1884 |
| 2021/0155819 A1* | 5/2021 | Kobayashi | H01L 31/022466 |
| 2022/0110569 A1* | 4/2022 | Hatakeyama | A61B 5/268 |
| 2022/0228015 A1* | 7/2022 | Matsubara | C08G 59/4223 |

FOREIGN PATENT DOCUMENTS

| | | | |
|---|---|---|---|
| JP | 2007157434 A | 6/2007 |
| JP | 2009295602 A | 12/2009 |
| JP | 2010209152 A | 9/2010 |
| JP | 2011100573 A | 5/2011 |
| JP | 5246207 B2 | 7/2013 |
| JP | 2014135463 A | 7/2014 |
| JP | 2018006501 A | 1/2018 |
| JP | 2019102719 A | 6/2019 |
| KR | 1020150127272 A | 11/2015 |
| KR | 20180000941 A | 1/2018 |
| WO | 2016104232 A1 | 6/2016 |

OTHER PUBLICATIONS

Korean Intellectual Property Office, Office Action Issued in Application No. 10-2022-7040628, Dec. 17, 2024, Korea, 14 Pages.
European Patent Office, Extended European Search Report Issued in Application No. 21797325.4, Apr. 17, 2025, Germany, 11 pages.
Korean Intellectual Property Office, Office Action Issued in Application No. 10-2022-7040628, Aug. 7, 2025, 12 Pages.

* cited by examiner

CHANGE IN MOISTURE PERMEATION AMOUNT
WITH RESPECT TO FILM THICKNESS

METHOD FOR MANUFACTURING ELECTRONIC COMPONENT

TECHNICAL FIELD

The present invention relates to a method for manufacturing an electronic component, wherein an electrode is formed on an electrode-forming body for electronic components, such as a laminated body for a multilayer electronic component or a cathode-forming body for a solid electrolytic capacitor to manufacture the electronic component.

BACKGROUND ART

In recent years, electronic devices have increasingly been used in environments more severe than before, and thus electronic components mounted on the electronic devices are also required not to fail even when used in the environments more severe than before.

Specifically, for example, in the case of a mobile device such as a smartphone, high impact resistance is required so that even when the mobile device is dropped and subjected to an impact, an electronic component thereof does not fall off from a substrate due to cracks or interfacial peeling in a connecting portion between the substrate and the electronic component or an electronic component thereof does not crack itself.

In addition, in the case of an electronic device mounted on an automobile, the electronic device is also required to have high impact resistance so that even when being subjected to an impact due to vibration during driving, an electronic component thereof does not fall off from a substrate due to cracks or interfacial peeling in a connecting portion between the substrate and the electronic component or an electronic component thereof does not crack itself.

Patent Literature 1 discloses a multilayer electronic component with an external electronic electrode in which a conductive resin layer is formed on an underlying metal layer formed by plating. Since the conductive resin layer is formed on the underlying metal layer in this multilayer electronic component, even if a substrate having the multilayer electronic component mounted thereon is bent, the conductive resin layer relaxes the stress, thereby suppressing the occurrence of cracks.

As a conductive resin composition used to form an conductive resin layer, a conductive resin containing an epoxy resin having excellent heat resistance, moisture resistance, and adhesiveness has conventionally been used. For example, Patent Literature 2 discloses a conductive resin composition containing a conductive filler, a chelate-forming substance, a phenol resin, a modified epoxy resin, and a boron compound.

CITATION LIST

Patent Literature

[Patent Literature 1] Japanese Patent Laid-Open No. 2009-295602
[Patent Literature 2] International Publication No. WO 2016/104232

SUMMARY OF INVENTION

Technical Problem

A mobile device or an automobile may be exposed to a high humidity environment, and thus electronic components mounted on the mobile device or the automobile are required to have high moisture resistance reliability so as to prevent moisture from entering the inside.

However, a conductive resin layer formed of a conductive resin composition containing an epoxy resin as a main component of a resin component is insufficient for high moisture resistance required for an electronic component used in a mobile device and an automobile, although the layer has a certain degree of moisture resistance.

In addition, if the conductive resin composition containing the epoxy resin as the main component of the resin component is used, it is necessary to adjust flexibility by blending a butyral resin with the epoxy resin, and thus restrictions on design arise. This causes restrictions on manufacturing of an electronic component.

Therefore, the first object of the present invention is to provide a method for manufacturing an electronic component having high moisture resistance. The second object of the present invention is to provide a method for manufacturing an electronic component having reduced restrictions on design and manufacturing and high manufacturing efficiency, in addition to high moisture resistance.

Solution to Problem

As a result of intensive studies to solve the problems above, the present inventors have found that a conductive resin layer is formed on an electrode-forming body for electronic components by using a conductive resin composition containing a silicone resin, thereby producing an electronic component having excellent moisture resistance and reduced restrictions on design and manufacturing compared with the case of using a conductive resin composition containing an epoxy resin as the main component of the resin component, and thus have completed the present invention.

In other words, the present invention (1) provides a method for manufacturing an electronic component, including:

a preparation step of preparing an electrode-forming body for electronic components; and an electrode forming step of forming an electrode on an outer surface of the electrode-forming body for electronic components, wherein in the electrode forming step, a conductive resin layer is formed on the electrode-forming body for electronic components by using a conductive resin composition containing a silicone resin.

The present invention (2) provides the method for manufacturing an electronic component according to (1), wherein in the electrode forming step, the conductive resin composition containing the silicone resin is applied to the electrode-forming body for electronic components by a dip method.

The present invention (3) provides the method for manufacturing an electronic component according to (1) or (2), wherein the electrode-forming body for electronic components is a laminated body for a multilayer electronic component formed of a ceramic layer and an internal electrode layer.

The present invention (4) provides the method for manufacturing an electronic component according to (1) or (2), wherein the electrode-forming body for electronic components is a cathode-forming body for a solid electrolytic capacitor composed of an anode and a dielectric layer formed on a surface of the anode.

The present invention (5) provides the method for manufacturing an electronic component according to any of (1) to (4), wherein the conductive resin composition containing the silicone resin is a conductive resin composition containing a thermosetting silicone resin; and in the electrode forming step, a conductive resin layer is formed on the electrode-forming body for electronic components by applying the conductive resin composition containing the thermosetting silicone resin to the electrode-forming body for electronic components and then curing the conductive resin composition.

The present invention (6) provides the method for manufacturing an electronic component according to any of (1) to (5), wherein the conductive resin composition containing the silicone resin contains a metal powder.

The present invention (7) provides the method for manufacturing an electronic component according to (6), wherein the metal powder contains at least one or more powders selected from: silver, copper, nickel, palladium, platinum, gold, and aluminum; a powder containing an alloy of one or more of these metals; a silver-coated copper powder; and a silver-coated nickel powder.

The present invention (8) provides the method for manufacturing an electronic component according to (6) or (7), wherein the metal powder contains a flaky metal powder, and a content ratio of the flaky metal powder to the entire metal powder is 20.0% by mass or more.

The present invention (9) provides the method for manufacturing an electronic component according to (8), wherein the flaky metal powder has an aspect ratio of 1.5 to 50.0.

The present invention (10) provides the method for manufacturing an electronic component according to (8) or (9), wherein the flaky metal powder has a number average particle diameter of 0.1 to 20.0 μm as measured using a scanning electron microscope (SEM).

The present invention (11) provides the method for manufacturing an electronic component according to any of (8) to (10), wherein the flaky metal powder has a specific surface area of 0.5 to 5.0 m²/g.

The present invention (12) provides the method for manufacturing an electronic component according to any of (8) to (11), wherein the metal powder contains a spherical metal powder, a content ratio of the spherical metal powder to the entire metal powder is 80.0% by mass or less, and a content of the flaky metal powder with respect to the entire metal powder is 20.0% by mass or more.

The present invention (13) provides the method for manufacturing an electronic component according to (12), wherein the spherical metal powder has a volume-based cumulative 50% particle diameter ($D_{50}$) of 0.01 to 7.0 μm.

The present invention (14) provides the method for manufacturing an electronic component according to (12) or (13), wherein the spherical metal powder has a specific surface area of 0.2 to 3.0 m²/g.

The present invention (15) provides the method for manufacturing an electronic component according to any of (6) to (14), wherein a content of a resin component in the conductive resin composition containing the silicone resin is 2.5 to 35.0 parts by mass with respect to 100.0 parts by mass of the metal powder.

The present invention (16) provides the method for manufacturing an electronic component according to any of (6) to (15), wherein a content ratio of the silicone resin to the total resin component ((silicone resin/total resin)×100) is 70.0% by mass or more in the conductive resin composition containing the silicone resin.

Advantageous Effects of Invention

According to the present invention, it is possible to provide a method for manufacturing an electronic component having high moisture resistance. In addition, according to the present invention, it is possible to provide a method for manufacturing an electronic component having reduced restrictions on design and manufacturing and high manufacturing efficiency, in addition to high moisture resistance.

DESCRIPTION OF EMBODIMENTS

The method for manufacturing an electronic component of the present invention is a method for manufacturing an electronic component including:

a preparation step of preparing an electrode-forming body for electronic components; and an electrode forming step of forming an electrode on an outer surface of the electrode-forming body for electronic components, wherein in the electrode forming step, a conductive resin layer is formed on the electrode-forming body for electronic components by using a conductive resin composition containing a silicone resin.

Figure 1:
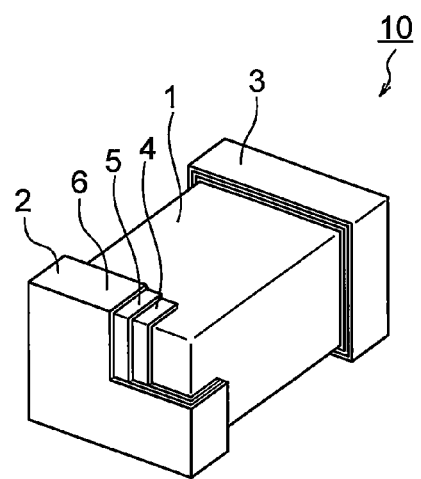
FIG. 1 is a schematic perspective view illustrating a multilayer electronic component.
Figure 2:
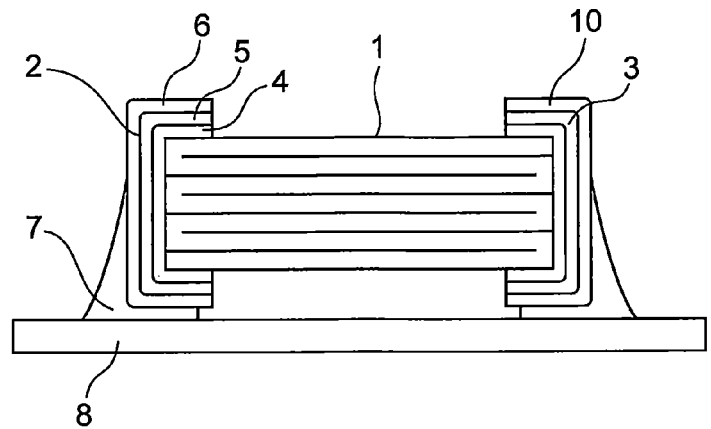
FIG. 2 is a schematic cross-sectional view illustrating a multilayer electronic component mounted on a substrate.
Figure 3:
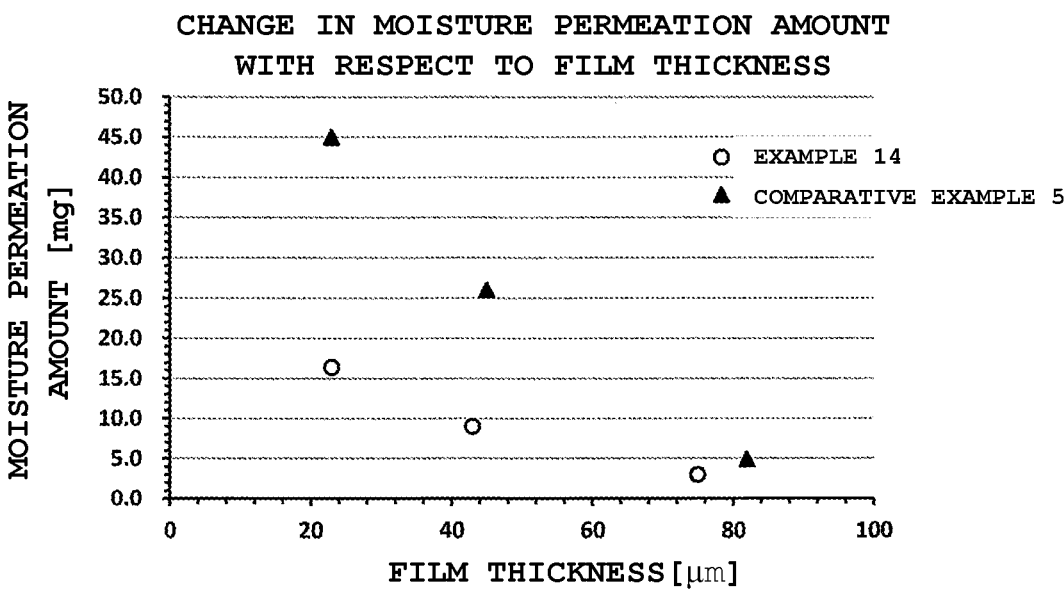

An electronic component of an embodiment obtained by an embodiment of the method for manufacturing electronic component of the present invention will be described with reference to FIGS. 1 and 2. FIG. 1 is a schematic perspective view illustrating a multilayer electronic component. FIG. 2 is a schematic cross-sectional view illustrating a multilayer electronic component mounted on a substrate. A multilayer electronic component 10 is composed of: a laminated body 1 for a multilayer electronic component formed of a plurality of ceramic layers and a plurality of internal electrode layers; and external terminal electrodes 2 and 3 formed on the outer surfaces of both ends of the laminated body 1 for the multilayer electronic component and electrically connected to the internal electrode layers. Each of the external terminal electrodes 2 and 3 is composed of: a metal layer 4 formed on the outer surface of the laminated body 1 for the multilayer electronic component; a conductive resin layer 5 formed on the surface of the metal layer 4; and a plating layer 6 formed on the surface of the conductive resin layer 5. In short, the conductive resin layer 5 is disposed between the metal layer 4 and the plating layer 6 in each of the external terminal electrodes 2 and 3. The multilayer electronic component 10 is mounted on a substrate 8 by solder 7.

The method for manufacturing a multilayer electronic component of the present invention includes a preparation step and an electrode forming step.

The preparation step is a step of preparing an electrode-forming body for electronic components. The electrode-forming body for electronic components refers to an object on which an electrode is formed in a manufacturing process of an electronic component. Examples of the electrode-forming body for electronic components include: a laminated body for a multilayer electronic component formed of a plurality of ceramic layers and a plurality of internal electrode layers; a cathode-forming body for a solid electrolytic capacitor composed of an anode and a dielectric layer formed on a surface of the anode; and an electrode-forming body for a chip resistor with an end surface electrode.

The laminated body for the multilayer electronic component is formed of a plurality of ceramic layers and a plurality of internal electrode layers. In the laminated body for the multilayer electronic component, adjacent ceramic layers are connected to each other by an internal electrode layer interposed therebetween. Examples of the laminated body for the multilayer electronic component include a laminated body for a multilayer ceramic capacitor, a laminated body for a multilayer ceramic inductor, and a laminated body for a piezoelectric actuator.

Examples of substances forming the ceramic layers that constitute the laminated body for the multilayer electronic component include barium titanate, strontium titanate, calcium titanate, barium zirconate, strontium zirconate, calcium zirconate, and strontium calcium zirconate.

Examples of substances forming the internal electrode layers that constitute the laminated body for the multilayer electronic component include any one of nickel, palladium, silver, copper, and gold, or an alloy containing one or more of these metals (for example, an alloy of silver and palladium).

The cathode-forming body for the solid electrolytic capacitor is composed of an anode and a dielectric layer formed on the surface of the anode. Examples of combinations of substances forming the anode and the dielectric layer include tantalum and tantalum pentoxide, aluminum and aluminum oxide, and niobium and niobium pentoxide.

The electrode forming step is a step of forming an electrode on the outer surface of the electrode-forming body for electronic components. Note that in the present invention, the formation of the conductive resin layer on the electrode-forming body for electronic components includes both a case where the conductive resin layer is directly formed on the surface of the electrode-forming body for electronic components and a case where another layer or a film (for example, a metal layer or a conductor layer) is first formed on the electrode-forming body for electronic components and then the conductive resin layer is formed on the surface thereof. Therefore, in the electronic component obtained by the method for manufacturing an electronic component of the present invention, there are both cases where the conductive resin layer is directly formed on the surface of the electrode-forming body for electronic components and where the conductive resin layer is formed with another layer or a film (for example, a metal layer or a conductor layer) interposed between electrode-forming bodies for electronic components.

In the electrode forming step, the position and method of forming the electrode, the thickness of the electrode, the number of electrodes, the type of metal constituting the electrode, the shape of the metal powders used in the formation of the electrode, and the like are appropriately selected depending on the electronic component to be manufactured.

In the electrode forming step, a conductive resin layer is formed on the electrode-forming body for electronic components by using the conductive resin composition containing the silicone resin.

The conductive resin composition containing the silicone resin contains at least silicone resin. When the conductive resin composition contains the silicone resin, the moisture resistance of the conductive resin layer becomes high while the rate of change in moisture permeability with respect to the change in film thickness becomes thereby small, increasing formability. Therefore, manufacturing efficiency can be increased. Examples of the silicone resin include a thermosetting silicone resin and a thermoplastic silicone resin. Among them, a thermosetting silicone resin is preferred. Examples of the thermosetting silicone resin include a self-curable resin, which is cured by heating without using a curing agent, and a curing agent-curable resin, which is cured with a curing agent. Examples of the self-curable silicone resin include a silicone resin that has a hydroxy group as a reactive functional group and is cured through a dehydration reaction upon heating. In addition, examples of the curing agent-curable silicone resin include a silicone resin that is cured by adding a catalyst and heating to cause a crosslinking reaction by a hydrocarbon group such as an alkenyl group.

The thermosetting silicone resin is not particularly limited, and examples thereof include resins whose skeleton portion has a structure such as a silicone oligomer, organosiloxane, diorganosiloxane, organopolysiloxane, and diorganopolysiloxane, and one or more reactive functional groups. As the skeleton portion of the curable silicone resin, organopolysiloxane and diorganopolysiloxane are preferred from the viewpoint of increasing the moisture resistance of the conductive resin layer. The skeleton portion of the thermosetting silicone resin may be linear or branched.

The reactive functional group of the thermosetting silicone resin is not particularly limited, and examples thereof include a hydroxy group, an alkenyl group, a hydrogensilyl group, a (meth)acryloyl group, an epoxy group, an amino group, a carbinol group, a mercapto group, a carboxy group, and a phenol group. As the reactive functional group of the thermosetting silicone resin, a hydroxy group and an alkenyl group are preferred from the viewpoint of moisture resistance, and an epoxy group is preferred from the viewpoint of adhesiveness.

The thermosetting silicone resin may have a functional group such as an alkyl group or an aromatic group on a side chain, in addition to the reactive functional group. As the side chain of the thermosetting silicone resin, a methyl group and a phenyl group are preferred from the viewpoint of increasing the moisture resistance of the conductive resin layer.

The curing agent for the curing agent-curable thermosetting silicone resin is not particularly limited, and examples thereof include a platinum-based curing agent, a titanium-based curing agent, an aluminum-based curing agent, a zinc-based curing agent, an iron-based curing agent, and phosphoric acid-based curing agent. If the silicone resin has an epoxy group as a reactive functional group of the thermosetting silicone resin, a known curing agent used for an epoxy resin can be used, and examples thereof include an amine-based curing agent such as ethylenediamine, an organic acid such as oxalic acid, and an acid anhydride such as phthalic anhydride.

The molecular weight (weight average molecular weight Mw) of the thermosetting silicone resin is not particularly limited, but is preferably 1000 to 300000, and particularly preferably 2000 to 200000.

The conductive resin composition containing the silicone resin contains the metal powder as a conductive material. Examples of the metal powder include a powder containing silver powder, copper powder, nickel powder, palladium powder, platinum powder, gold powder, and aluminum powder; a powder containing an alloy of any one or more of silver, copper, nickel, palladium, platinum, gold, and aluminum; a silver-coated copper powder; and a silver-coated nickel powder.

The metal powder contains a flaky metal powder, and the content ratio of the flaky metal powder with respect to the entire metal powder is preferably 20.0 to 100.0% by mass, more preferably 40.0 to 100.0% by mass, and particularly preferably 60.0 to 100.0% by mass. When the content ratio of the flaky metal powder with respect to the entire metal powder is in the above range, the conductivity and adhesiveness of the resulting conductive resin layer are enhanced.

An aspect ratio of the flaky metal powder is preferably 1.5 to 50.0, particularly preferably 2.0 to 30.0, and further preferably 5.0 to 20.0. When the aspect ratio of the flaky metal powder is in the above range, the conductivity and adhesiveness of the conductive resin layer to be obtained are enhanced. Note that in the present invention, the aspect ratio of the flaky metal powder is determined by measuring aspect ratios of 50 metal powders arbitrarily selected in observation of scanning electron microscope (SEM) images with the particle diameter relative to the particle thickness (particle diameter/thickness) as the aspect ratio and calculating an average value thereof.

The number average particle diameter of the flaky metal powder measured using a scanning electron microscope (SEM) is preferably 0.1 to 20.0 μm, more preferably 0.3 to 15.0 μm, further preferably 0.5 to 10.0 μm, and particularly preferably 1.0 to 5.0 μm. When the number average particle diameter of the flaky metal powder is in the above range, the conductivity and adhesiveness of the conductive resin layer to be obtained are enhanced. Note that in the present invention, the number average particle diameter of the flaky metal powder when measured using a scanning electron microscope (SEM) is determined by measuring the particle diameters of 50 metal powders arbitrarily selected in observation of scanning electron microscope (SEM) images with the diameter of the longest part of the particle as the particle diameter and calculating an average value thereof as the number average particle diameter.

The specific surface area of the flaky metal powder is preferably 0.5 to 5.0 $m^2/g$ and particularly preferably 0.6 to 4.0 $m^2/g$. When the specific surface area of the flaky metal powder is in the above range, the conductivity and adhesiveness of the conductive resin layer to be obtained are enhanced.

The metal powder contains a flaky metal powder and a spherical metal powder, and it is preferable that "the content ratio of the spherical metal powder with respect to the entire metal powder is 80.0% by mass or less, and the content of the flaky metal powder with respect to the entire metal powder is 20.0% by mass or more," and particularly preferable that "the content ratio of the spherical metal powder with respect to the entire metal powder is 60.0% by mass or less, and the content of the flaky metal powder with respect to the entire metal powder is 40.0% by mass or more." When the content ratios of the flaky metal powder and the spherical metal powder are in the above ranges, the conductivity and adhesiveness of the conductive resin layer to be obtained are enhanced.

The volume-based cumulative 50% particle diameter ($D_{50}$) of the spherical metal powder is preferably 0.01 to 7.0 μm, and particularly preferably 0.03 to 5.0 μm. When the $D_{50}$ of the spherical metal powder is in the above range, the conductivity and adhesiveness of the resulting conductive resin layer are enhanced. Note that in the present invention, the $D_{50}$ is determined as a 50% value in a volume-based integrated fraction ($D_{50}$) using a laser diffraction particle size distribution analyzer.

The specific surface area of the spherical metal powder is preferably 0.2 to 3.0 $m^2/g$ and particularly preferably 0.3 to 2.5 $m^2/g$. When the specific surface area of the spherical metal powder is in the above range, the conductivity and adhesiveness of the resulting conductive resin layer are enhanced.

The conductive resin composition containing a silicone resin may contain a resin other than the silicone resin as long as the effects of the present invention are not impaired. Examples of the resin other than the silicone resin include an epoxy resin, a butyral resin, an acetal resin, an acrylic resin, a polybutadiene-based resin, a cellulose-based resin, a (meth)acrylic resin, a styrene resin, a phenol resin, a polyurethane resin, a polyamide resin, a polyimide resin, a polyamide-imide resin, and alkyd resins.

The content ratio of the silicone resin to the total resin component in the conductive resin composition containing the silicone resin ((silicone resin/total resin component (silicone resin+resin other than silicone resin))×100) is preferably 70.0% by mass or more, more preferably 80.0% by mass or more, still more preferably 90.0% by mass or more, further preferably 95.0% by mass or more, and particularly preferably 100.0% by mass. When the content ratio of the silicone resin to the total resin component in the conductive resin composition is in the above range, the moisture resistance of the conductive resin layer becomes high while the rate of change in moisture permeation amount with respect to the change in film thickness can be reduced, thereby reducing restrictions on design and manufacturing of an electronic component. In addition, the formability can be increased, thereby increasing the manufacturing efficiency.

The content ratio of the epoxy resin to the total resin component in the conductive resin composition containing the silicone resin ((epoxy resin/total resin component (silicone resin+resin other than silicone resin))×100) is preferably 25.0% by mass or less, more preferably 20.0% by mass or less, still more preferably 10.0% by mass or less, further preferably 5.0% by mass or less, and particularly preferably 0.0% by mass. When the content ratio of the epoxy resin to the total resin component in the conductive resin composition is in the above range, the moisture resistance of the conductive resin layer becomes high while the rate of change in moisture permeation amount with respect to the change in film thickness can be reduced, thereby reducing restrictions on design and manufacturing of an electronic component. In addition, the formability is increased, thereby increasing the manufacturing efficiency.

The content ratio of the butyral resin to the total resin component in the conductive resin composition containing the silicone resin ((butyral resin/total resin component (silicone resin+resin other than silicone resin))×100) is preferably 20.0% by mass or less, more preferably 10.0% by mass or less, further preferably 5.0% by mass or less, and particularly preferably 0.0% by mass. When the content ratio of the butyral resin to the total resin component in the conductive resin composition is in the above range, the moisture resistance of the conductive resin layer becomes high while the rate of change in moisture permeation amount with respect to the change in film thickness can be reduced, thereby reducing restrictions on design and manufacturing of an electronic component.

In the conductive resin composition containing the silicone resin, the content of the resin component (the content of the total resin component (silicone resin+resin other than silicone resin)) is preferably 2.5 to 35.0 parts by mass, more preferably 5.0 to 25.0 parts by mass, further preferably 7.0 to 23.0 parts by mass, and particularly preferably 11.0 to 20.0 parts by mass with respect to 100.0 parts by mass of the metal powder. When the content of the resin component in the conductive resin composition is in the above range, the conductivity and adhesiveness of the resulting conductive resin layer are enhanced. In addition, the rheology is suitable for molding, especially when the conductive resin layer is formed by the dip method.

If the conductive resin composition containing the silicone resin contains a curing agent, the content of the curing agent in the conductive resin composition is appropriately selected depending on the content of the thermosetting resin in the conductive resin composition, and is usually 0.01 to 10.0% by mass.

The conductive resin composition containing the silicone resin may contain an organic solvent. The organic solvent is not particularly limited, and examples thereof include ter-pineol, dihydroterpineol, dihydroterpineol acetate, second-ary butyl alcohol, butyl carbitol, butyl carbitol acetate, and benzyl alcohol.

The conductive resin composition containing the silicone resin may contain additives such as an antifoaming agent, a plasticizer, a dispersant, and a rheology modifier, if neces-sary, in addition to the components described above. Examples of the plasticizer include dimethyl phthalate, diethyl phthalate, dibutyl phthalate, di-2-ethylhexyl phtha-late, di-n-octyl phthalate, butyl benzyl phthalate, dioctyl adipate, diisononyl adipate, dibutyl sebacate, diethyl seba-cate, dioctyl sebacate, tricresyl phosphate, chlorinated par-affin, and diisononyl cyclohexane 1,2-dicarboxylate (DINCH). Examples of the rheology modifier include a silica powder. If the conductive resin composition contain-ing the silicone resin contains a silica powder, the content of the silica powder in the conductive resin composition con-taining the silicone resin is preferably 0.0 to 3.0 parts by mass and particularly preferably 0.0 to 2.0 parts by mass with respect to 100 parts by mass of the metal powder.

When 1% strain is applied to the conductive resin com-position containing the silicone resin at an angular frequency of 1 Hz, the value of the phase difference $\delta$ between the strain and the stress caused by the strain is preferably in the range of 32 to 88°, more preferably in the range of 43 to 88°, still more preferably in the range of 45 to 87°, even more preferably in the range of 47 to 85°, particularly preferably in the range of 49 to 83°, and further preferably in the range of 51 to 81°. When the value of the phase difference $\delta$ of the conductive resin composition is in the above range, the formability when an electrode is formed on the electrode-forming body for electronic components by using the con-ductive resin composition becomes high.

Especially, if the conductive composition containing the silicone resin is used to form an external electrode on a laminated body for a multilayer electronic component by a dip method, the value of the phase difference $\delta$ described above is not particularly limited, but the lower limit thereof is preferably 45° or more, more preferably 47° or more, particularly preferably 49° or more, further preferably 50° or more, and still further preferably 51° or more from the viewpoint of increasing the formability. The upper limit thereof is preferably 87° or less, more preferably 85° or less, particularly preferably 83° or less, further preferably 81° or less, and still further preferably 80° or less from the view-point of increasing the formability. Note that the upper limit and the lower limit of the phase difference $\delta$ can be arbitrarily combined. The value of the phase difference $\delta$ described above is, for example, preferably in the range of 45 to 87°, more preferably in the range of 47 to 85°, particularly preferably in the range of 49 to 83°, further preferably in the range of 51 to 81° from the viewpoint of increasing the formability.

In particular, if the conductive composition containing the silicone resin is used to form a cathode on the cathode-forming body for the solid electrolytic capacitor by the dip method, the value of the phase difference $\delta$ described above is not particularly limited, but the lower limit thereof is preferably 32° or more, more preferably 37° or more, still more preferably 45° or more, even more preferably 47° or more, particularly preferably 49° or more, and further pref-erably 510 or more from the viewpoint of increasing the formability. The upper limit thereof is preferably 87° or less, more preferably 85° or less, particularly preferably 83° or less, further preferably 81° or less, and still further prefer-ably 80° or less from the viewpoint of increasing the formability. Note that the upper limit and the lower limit of the phase difference $\delta$ can be arbitrarily combined. The value of the phase difference $\delta$ described above is, for example, preferably in the range of 32 to 87°, more preferably in the range of 37 to 87°, still more preferably in the range of 45 to 87°, even more preferably in the range of 47 to 85°, particularly preferably in the range of 49 to 83°, and further preferably in the range of 51 to 81° from the viewpoint of increasing the formability.

From the viewpoint of increasing the formability when an electrode is formed on the electrode-forming body for electronic components by using the conductive resin com-position, the lower limit of the ratio of the viscosity of the conductive resin composition containing the silicone resin at a shear rate of 0.4 (1/s) to the viscosity thereof at a shear rate of 40 (1/s) is preferably 1.4 or more, more preferably 1.5 or more, still more preferably 2.0 or more, and particularly preferably 2.5 or more. In addition, the upper limit of the ratio of the viscosity of the conductive resin composition at a shear rate of 0.4 (1/s) to the viscosity thereof at a shear rate of 40 (1/s) is preferably 60.0 or less, more preferably 30.0 or less, still more preferably 20.0 or less, and particularly preferably 15.0 or less. Moreover, the ratio of the viscosity of the conductive resin composition containing the silicone resin at a shear rate of 0.4 (1/s) to the viscosity thereof at a shear rate of 40 (1/s) is, for example, preferably in the range of 1.4 to 60.0, more preferably in the range of 1.5 to 60.0, still more preferably in the range of 1.5 to 30.0, even more preferably in the range of 2.0 to 20.0, further preferably in the range of 2.5 to 20.0, particularly preferably in the range of 2.5 to 15.0, and particularly preferably in the range of 3.0 to 15.0, from the viewpoint of increasing the formability when an electrode is formed on the electrode-forming body for electronic components by using the conductive resin composition.

Especially, if the conductive composition containing a silicone resin is used to form an external electrode on a laminated body for a multilayer electronic component by a dip method, the ratio of the viscosity described above is not particularly limited, but the lower limit thereof is preferably 1.5 or more, more preferably 2.0 or more, and particularly preferably 2.5 or more, and the upper limit thereof is preferably 20.0 or less, more preferably 15.0 or less, and particularly preferably 12.0 or less, from the viewpoint of increasing the formability. The ratio of the viscosity described above is, for example, preferably in the range of 1.5 to 20.0, more preferably in the range of 2.0 to 20.0, particularly preferably in the range of 2.5 to 15.0, and further preferably in the range of 2.5 to 12.0, from the viewpoint of increasing the formability.

Moreover, especially if the conductive composition containing a silicone resin is used to form a cathode on the cathode-forming body for the solid electrolytic capacitor by the dip method, the ratio of the viscosity described above is not particularly limited, but the lower limit thereof is preferably 1.5 or more, more preferably 2.0 or more, and particularly preferably 2.5 or more, and the upper limit thereof is preferably 60.0 or less, more preferably 50.0 or less, still more preferably 35.0 or less, even more preferably 20.0 or less, and particularly preferably 15.0 or less, from the viewpoint of increasing the formability. The ratio of the viscosity described above is, for example, preferably in the range of 1.5 to 60.0, more preferably in the range of 2.0 to 50.0, still more preferably in the range of 2.0 to 35.0, even more preferably in the range of 2.0 to 20.0, and particularly preferably in the range of 2.5 to 15.0, from the viewpoint of increasing the formability.

In the electrode forming step, the conductive resin composition containing the silicone resin is applied to the electrode-forming body for electronic components to form a conductive resin composition layer containing the silicone resin at a predetermined position of the electrode-forming body for electronic components, and then the conductive resin composition containing the silicone resin is thermally cured and/or dried to form a conductive resin layer.

In the electrode forming step, the conductive resin layer can be directly formed on the surface of the electrode-forming body for electronic components by applying the conductive resin composition containing the silicone resin directly to the surface of the electrode-forming body for electronic components. In addition, in the electrode forming step, an appropriate step can be performed depending on the type of the electronic component before the conductive resin layer is formed on the electrode-forming body for electronic components. For example, in the case of a multilayer electronic component, in the electrode forming step, after a metal layer is formed at a predetermined position of the electrode-forming body for electronic components, the conductive resin composition containing the silicone resin is applied to the surface of the metal layer to form a conductive resin composition layer containing the silicone resin at a predetermined position of the electrode-forming body for electronic components, and then the conductive resin composition containing the silicone resin is cured to form a conductive resin layer on the surface of the metal layer. Moreover, for example, in the case of a solid electrolytic capacitor, in the electrode forming step, a conductive layer composed of a carbon layer is formed at a predetermined position of the cathode-forming body for a solid electrolytic capacitor, the conductive resin composition containing the silicone resin is applied to the surface of the conductive layer to form a conductive resin composition layer containing the silicone resin at a predetermined position of the electrode-forming body for electronic components, the conductive resin composition containing the silicone resin is cured to form a conductive resin layer on the surface of the conductive layer. In addition, the electrode forming step may include an appropriate step depending on the type of the electronic component after the conductive resin layer is formed on the electrode-forming body for electronic components. For example, in the case of a multilayer electronic component, in the electrode forming step, a conductive resin layer is formed at a predetermined position of the electrode-forming body for electronic components, and then a plating layer is formed on the surface of the conductive resin layer.

In the electrode forming step, an electrode can be formed by forming a conductive resin layer on the electrode-forming body for electronic components. In short, in this embodiment, the electrode is composed of only the conductive resin layer.

In the electrode forming step, when the conductive resin layer is formed on the electrode-forming body for electronic components using the conductive resin composition containing the silicone resin, the conductive resin composition containing the silicone resin can be applied to the electrode-forming body for electronic components by a dip method to form a conductive resin composition layer containing the silicone resin at a predetermined position of the electrode-forming body for electronic components. Since the conductive resin composition containing the silicone resin has excellent formability, the conductive resin composition layer containing the silicone resin can be rapidly formed at a predetermined position by the dip method. Therefore, in the method for manufacturing an electronic component of the present invention, the conductive resin composition containing the silicone resin is applied to the electrode-forming body for electronic components by the dip method, thereby increasing the manufacturing efficiency.

A first embodiment of the electrode forming step (hereinafter, also referred to as electrode forming step (1)) is an electrode forming step in the case where the electrode-forming body for electronic components is a laminated body for a multilayer electronic component formed of a ceramic layer and an internal electrode layer. The electrode forming step (1) includes at least a conductive resin layer forming step (1A) of forming a conductive resin layer on the outer surface of the laminated body for the multilayer electronic component using the conductive resin composition containing the silicone resin. The electrode forming step (1) is not particularly limited as long as the step includes the conductive resin layer forming step (1A) of forming a conductive-resin layer on the outer surfaces of the laminated body for the multilayer electronic component using the conductive resin composition containing the silicone resin, and examples thereof include an electrode forming step (1) including at least a metal layer forming step, a conductive resin layer forming step (1A), and a plating layer forming step.

The electrode forming step (1) is an electrode forming step in the case where the electrode-forming body for electronic components is a laminated body for a multilayer electronic component formed of a ceramic layer and an internal electrode layer. The electrode forming step (1) includes at least a metal layer forming step, a conductive resin layer forming step (1A), and a plating layer forming step.

The metal layer forming step is a step of forming a metal layer electrically connected to the internal electrode layer on the outer surface of the laminated body for the multilayer electronic component. The metal forming a metal layer include at least one of Cu, Ag, Pd, Ni, Sn, Al, Au, and Pt, or an alloy containing at least one of these metals. The method for forming the metal layer is not particularly limited, and examples thereof include a dip method, a plating method, a roll coating method, a screen printing method, and a sputtering method. The thickness, shape, position, number, and the like of the metal layer are appropriately selected.

The conductive resin layer forming step (1A) is a step of forming a conductive resin layer on the surface of the metal layer formed in the metal layer forming step by using the conductive resin composition containing the silicone resin.

In the conductive resin layer forming step (1A), the conductive resin composition containing the silicone resin is applied to the surface of the metal layer formed in the metal layer forming step to form a conductive resin composition layer containing the silicon resin on the metal layer, and then the conductive resin composition containing the silicone resin is cured to form the conductive resin layer. The method for forming the conductive resin composition layer containing the silicone resin is not particularly limited, and examples thereof include a dip method, a screen printing method, and a roll coating method. Among them, the dip method is preferred. The thickness, shape, position, number and the like of the conductive resin composition layer containing the silicone resin are appropriately selected.

The plating layer forming step is a step of forming a plating layer on the surface of the conductive resin layer. Examples of the metal forming a plating layer include at least one of Ni, Cu, Sn, Ag, Au and the like, or an alloy containing at least one of these metals. The method for forming the plating layer is not particularly limited, and examples thereof include electrolytic plating and electroless plating. The thickness, shape, position, number, and the like of the plating layer are appropriately selected.

A second embodiment of the electrode forming step (hereinafter, also referred to as electrode forming step (2)) is an electrode forming step in the case where the electrode-forming body for electronic components is a cathode-forming body for a solid electrolytic capacitor. The electrode forming step (2) includes at least a conductive resin layer forming step (2A) of forming a conductive resin layer on the outer surface of the cathode-forming body for the solid electrolytic capacitor using the conductive resin composition containing the silicone resin. The electrode forming step (2) is not particularly limited as long as the step includes the conductive resin layer forming step (2A) of forming the conductive resin layer on the outer surface of the cathode-forming body for the solid electrolytic capacitor using the conductive resin composition containing the silicone resin, and examples thereof include an electrode forming step (2) including at least a solid electrolyte layer forming step, a carbon layer forming step, and a conductive resin layer forming step (2A).

The solid electrolyte layer forming step is a step of forming a solid electrolyte layer on the outer surface of the cathode-forming body for the solid electrolytic capacitor. The method for forming the solid electrolyte layer is not particularly limited, and the solid electrolyte layer can be formed by a known solid electrolyte manufactured by a chemical method. Examples of the solid electrolyte include conductive polymers such as polypyrrole, polyaniline, polythiophene, and polyacetylene.

The carbon layer forming step is a step of forming a carbon layer on the solid electrolyte layer. The method for forming the carbon layer is not particularly limited, and examples thereof include a method of drying and/or curing a carbon paste containing a resin, a solvent, and a carbon powder after applying the paste onto the solid electrolyte layer by a dip method. The carbon powder is not particularly limited, but a graphite powder is preferred.

The conductive resin layer forming step (2A) is a step of forming a conductive resin layer on the carbon layer using a conductive resin composition containing a silicone resin. The method for forming the conductive resin layer is not particularly limited, and examples thereof include a method in which a conductive resin composition containing a silicone resin is applied by a dip method, a screen printing method, a roll coating method, or the like, and then the conductive resin composition containing a silicone resin is cured.

Another embodiment of the electrode forming step includes an electrode forming step (3) in the case where the electrode-forming body for electronic components is an electrode-forming body for a chip resistor with an end surface electrode. The electrode forming step (3) includes at least a step of forming a conductive resin layer on the end surface electrode. The method for forming the conductive resin layer is not particularly limited, and examples thereof include a method in which a conductive resin composition containing a silicone resin is applied by a dip method, a screen printing method, a roll coating method, or the like, and then the conductive resin composition containing a silicone resin is cured. The electrode-forming body for the chip resistor with an end surface electrode includes, for example, an insulating substrate, a pair of upper surface electrodes formed on the insulating substrate, a resistor formed between the pair of upper surface electrodes, a protective layer formed so as to cover a part of the pair of upper surface electrodes and the resistor, and an end surface electrode formed on an end surface of the insulating substrate.

Another embodiment of the electrode forming step includes an electrode forming step (4) in the case where the electrode-forming body for electronic components is a substrate. The electrode forming step (4) includes at least a step of forming a conductive resin layer on the substrate. The method for forming the conductive resin layer is not particularly limited, and examples thereof include a method in which a conductive resin composition containing a silicone resin is applied by screen printing, inkjet printing, or dispenser printing, and then the conductive composition containing the silicone resin is cured. Examples of the substrate include an alumina substrate, a glass epoxy substrate, a paper phenol substrate, and a paper epoxy substrate.

Another embodiment of the electrode forming step includes an electrode forming step (5) in the case where the electrode-forming body for electronic components is a film. The electrode forming step (5) includes at least a step of forming a conductive resin layer on the film. The method for forming the conductive resin layer is not particularly limited, and examples thereof include a method in which a conductive resin composition containing a silicone resin is applied by screen printing, inkjet printing, or dispenser printing, and then the conductive composition containing the silicone resin is cured. Examples of the film include a polyimide film and a PET film.

Since the conductive resin composition containing a silicone resin is used to form a conductive resin layer in the method for manufacturing an electronic component of the present invention, the resulting conductive resin layer has higher moisture resistance than a conductive resin composition using an epoxy resin as the main component of a resin component. In addition, the resulting conductive resin layer has higher heat resistance than a conductive resin composition containing a large amount of a butyral resin as the resin component.

Furthermore, the conductive resin layer obtained by using the conductive resin composition containing the silicone resin has a smaller rate of change in moisture permeation amount with respect to change in film thickness than a conductive resin layer obtained from a conductive resin composition containing an epoxy resin as the main component and butyral.

In the method for manufacturing an electronic component of the present invention, a conductive resin composition containing a silicone resin is used. The conductive resin composition containing the silicone resin has good formability when a conductive resin layer is formed by applying the composition to a cathode-forming body for a solid electrolytic capacitor or the like, and also exhibits good formability when the conductive resin layer is formed on a laminated body for a multilayer electronic component or the like by a dip method by adjusting the rheology such as the ratio of the viscosity described above. Therefore, the method for manufacturing an electronic component of the present invention has excellent formability of the conductive resin layer.

The thickness of the conductive resin layer formed on the object on which the conductive resin layer is to be formed varies depending on the type of electronic components. Since the moisture permeation amount increases when the film thickness decreases, it is necessary to compensate for the increase in the moisture permeation amount by increasing the resin ratio in the conductive resin layer or the like. Then, as the rate of change in the moisture permeation amount with respect to the change in the film thickness increases, the amount of increase in the moisture permeation amount decreases. Therefore, many measures for compensating the amount of increase in the moisture permeation amount are required. Therefore, if a conductive resin composition having a large rate of change in moisture permeation amount with respect to a change in film thickness of the resulting conductive resin layer, that is, a conductive resin composition containing an epoxy resin as a main component and containing butyral is used for a manufacturing method, restrictions on design of electronic components become large, and accordingly, restrictions on manufacturing in forming the conductive resin layer become large. On the other hand, if the rate of change in the moisture permeation amount with respect to the change in the film thickness of the resulting conductive resin layer is small, that is, the conductive resin composition containing a silicone resin is used in the method for manufacturing an electronic component of the present invention, the restriction on the design of the electronic component is small, and therefore, the restriction on the manufacturing in forming the conductive resin layer can be reduced.

Hereinafter, the present invention will be described based on specific experimental examples, but the present invention is not limited thereto.

EXAMPLES

Manufacture of Spherical Silver Powder

First, silver powders listed in Table 1 were prepared based on the spray pyrolysis method described in Japanese Patent Publication No. 63-31522. In other words, for the silver powder 1, an aqueous solution in which a silver salt was dissolved was subjected to spray pyrolysis, and the collected silver powder was classified to adjust a $D_{50}$ value.

Note that the obtained silver powder was measured with a laser diffraction particle size distribution analyzer to determine the 50% value in a volume-based integrated fraction ($D_{50}$). The specific surface area was also measured by the BET method.

Method for Manufacturing Flaky Silver Powder

A spherical silver powder was manufactured by the method described above, and the obtained spherical silver powder was pulverized by a ball mill using stearic acid as a lubricant to manufacture a flaky silver powder. In observation of SEM (scanning electron microscope) images, particle diameters and aspect ratios of 50 silver powders arbitrarily selected were measured to determine average values thereof. The specific surface area was also measured by the BET method.

Silver-Coated Copper Flaky Powder

Silver-coated copper powders were manufactured by coating 90 parts by mass of spherical copper powders (manufactured by Mitsui Mining & Smelting Co., Ltd., model number: MA-CO3K) with 10 parts by mass of silver. The obtained silver-coated copper powders were pulverized by a ball mill using palmitic acid as a lubricant to manufacture flaky silver-coated copper powders. In observation of SEM images, particle diameters and aspect ratios of 50 silver powders arbitrarily selected were measured to determine average values thereof. The specific surface area was also measured by the BET method.

<Preparation of Conductive Resin Composition>

The metal powder, the silicone resin, and the epoxy resin were blended at the blending ratios listed in Tables 1 and 2 to prepare conductive resin compositions.

Metal Powder 1

Spherical silver powder, $D_{50}$: 2.3 μm, specific surface area: 0.5 m²/g

Metal Powder 2

Flaky silver powder, aspect ratio: 30, number average particle size: 6.0 μm, specific surface area: 1.0 m²/g Metal Powder 3

Flaky silver-coated copper powder, aspect ratio: 20, $D_{50}$: 8.0 μm, specific surface area: 1.5 m²/g Silicone Resin 1

Thermosetting silicone resin, self-curable, manufactured by Shin-Etsu Chemical Co., Ltd., model number: ES-1001N, reactive functional group: hydroxy group, epoxy group Epoxy Resin 1

Thermosetting epoxy resin, manufactured by DIC Corporation, model number: EXA4816

Butyral Resin 1

Butyral resin, manufactured by Sekisui Chemical Co., Ltd., model number: KS-10

Silica Powder 1

Fumed silica, manufactured by Tokuyama Corporation, model number: HM-20L

Note that the amount of the resin in the following table refers to an amount of the resin itself excluding the solvent.

Examples 1 to 8

Manufacture of Conductive Resin Composition

As resin solid content, 135 parts by mass of the silicone resin 1 and 165 parts by mass of benzyl alcohol (manufactured by Godo Co., Ltd.) were mixed, and solvent-replacement was performed under the conditions of 130° C. and 30 Pa for 1 hour to obtain a resin solution. The obtained resin solution, the metal powder 1, and metal powder 2 were mixed at a ratio listed in Table 1, and then kneaded using a three-roll mill (manufactured by INOUE MFG., INC.) to obtain a paste-like composition.

The obtained paste-like composition was diluted with benzyl alcohol to adjust the viscosity at 25° C. and a shear rate of 4 (1/s) to 30 Pa·s, and then the following evaluation was performed. The results are shown in Table 1.

Examples 9 to 13 and Comparative Examples 1 to 4

As resin solid content, 135 parts by mass of the silicone resin 1 and 165 parts by mass of benzyl alcohol (manufactured by Godo Co., Ltd.) were mixed, and solvent-replacement was performed under the conditions of 130° C. and 30 Pa for 1 hour to obtain a resin solution. The obtained resin solution, the metal powder 3, and the epoxy resin 1 were mixed at a ratio listed in Table 2, and then kneaded using a three-roll mill (manufactured by INOUE MFG., INC.) to obtain a paste-like composition.

The obtained paste-like composition was diluted with benzyl alcohol to adjust the viscosity at 25° C. and a shear rate of 4 (1/s) to 30 Pa·s, and then the following evaluation was performed. The results are shown in Table 2.

Performance Evaluation (Viscosity Ratio)

The viscosity of the conductive resin composition was measured at 25° C. under the conditions of a shear rate of 0.4 (1/s) and a shear rate of 40 (1/s) using a rotational viscometer (manufactured by Brookfield Engineering Laboratories, Inc., model number: HADV-II+Pro). The ratio of the viscosity at a shear rate of 0.4 (1/s) to the viscosity at a shear rate of 40 (1/s) was calculated as the viscosity ratio.

(Phase Difference δ)

A rheometer (manufactured by TA Instruments Japan Inc., model number: AR2000) was used to perform measurement under the conditions of 25° C., an angular frequency of 1 Hz, and a strain of 1% with a parallel plate having a diameter of 40 mm to obtain a value of the phase difference δ of the conductive resin composition.

(Moisture Permeation Amount)

The conductive resin composition was cast on a PET film to a thickness of 250 μm and cured under the conditions of 200° C. for 60 minutes to obtain a cured film. The resulting cured film was cut into a circle of 7.5 mm in diameter and fixed with an adhesive so as to cover a 5 ml glass bottle containing 2 g of silica gel. Thereafter, the glass bottle was placed in a 750 ml vessel containing 100 ml of purified water so that the cured film did not come into contact with the purified water. The vessel was then sealed and placed in a dryer at 65° C. to be left for 15 hours. The weight of the glass bottle was measured before and after the glass bottle was placed in the dryer, and the weight increase was defined as the moisture permeation amount. Samples having a moisture permeation amount of more than 160 mg were evaluated as "rating: 1, unacceptable, unusable, and extremely low moisture resistance," samples having a moisture permeation amount of more than 80.0 mg and 160 mg or less were evaluated as "rating: 2, unacceptable, unusable, and low moisture resistance," samples having a moisture permeation amount of more than 40.0 mg and 80.0 mg or less were evaluated as "rating 3: acceptable and usable," samples having a moisture permeation amount of more than 20.0 mg and 40.0 mg or less were evaluated as "rating 4: acceptable, usable, and high moisture resistance," and samples having a moisture permeation amount of 20.0 mg or less were evaluated as "rating 5: acceptable, usable, and extremely high moisture resistance."

(Elongation Percentage)

The conductive resin composition was cast on a PET film to a thickness of 250 μm and cured under the conditions of 200° C. for 60 minutes to obtain a cured film. The resulting cured film was cut into a 5 mm wide rectangle, and the length of the coating film when a tensile load of 9.8 N was applied in the long axis direction was measured using a viscoelasticity measuring apparatus (manufactured by Hitachi High-Tech Science Corporation, model number: DMA-7100). The ratio of the length extended when the load was applied to the length 10 mm before the load was applied was calculated and defined as the elongation percentage.

(Specific Resistance)

The conductive resin composition was cast on a slide glass substrate to a width of 1 cm, a length of 5 cm, and a thickness of 50 μm and cured under the conditions of 200° C. for 60 minutes to obtain a cured film. The resistance of the surface of the cured film was measured by a four-terminal method using a digital multimeter (manufactured by Keithley Instruments, KEITHLEY2002), and the specific resistance was calculated from the obtained value and the sample thickness.

(Adhesion Strength)

The conductive resin composition was cast on a slide glass substrate to a thickness of 50 μm and cured by placing an aluminum cylinder having a diameter of 3 mm thereon under the conditions of 200° C. for 60 minutes. The sample was pulled in the vertical direction at a rate of 0.5 m/s using a bond tester (manufactured by SEISHIN TRADING CO., LTD, model number: SS-30WD) to measure the value at break.

TABLE 1

| | Content (parts by mass) | | | | | Moisture | | | | |
| | Metal Powder | Metal Powder | Silicone Resin | Viscosity | Phase difference | Permeation amount | | Elongation percentage | Specific resistance | Adhesion strength |
| | 1 | 2 | 1 | ratio | δ | [mg] | Rating | [%] | [μΩ*cm] | [MPa] |
| Example 1 | 40.0 | 60.0 | 3.0 | 23.2 | 43 | 8.9 | 5 | 0.20 | 15 | 2.1 |
| Example 2 | 40.0 | 60.0 | 5.0 | 16.4 | 45 | 2.5 | 5 | 0.30 | 25 | 3.3 |
| Example 3 | 40.0 | 60.0 | 8.0 | 11.3 | 50 | 5.8 | 5 | 0.32 | 21 | 3.0 |
| Example 4 | 40.0 | 60.0 | 12.0 | 7.2 | 67 | 3.6 | 5 | 0.34 | 43 | 5.1 |
| Example 5 | 40.0 | 60.0 | 18.0 | 3.0 | 72 | 4.6 | 5 | 0.37 | 99 | 6.7 |
| Example 6 | 40.0 | 60.0 | 21.0 | 2.1 | 80 | 1.4 | 5 | 0.40 | 163 | 8.5 |

TABLE 1-continued

| | Content (parts by mass) | | | | Moisture | | | | |
| | Metal Powder | Metal Powder | Silicone Resin | Viscosity | Phase difference | Permeation amount | | Elongation percentage | Specific resistance | Adhesion strength |
| | 1 | 2 | 1 | ratio | δ | [mg] | Rating | [%] | [μΩ*cm] | [MPa] |
|---|---|---|---|---|---|---|---|---|---|---|
| Example 7 | 40.0 | 60.0 | 25.0 | 1.5 | 87 | 4.1 | 5 | 0.48 | 492 | 9.6 |
| Example 8 | 40.0 | 60.0 | 30.0 | 1.2 | 89 | 2.2 | 5 | 0.51 | 923 | 11.3 |

TABLE 2

| | Content (parts by mass) | | | Content ratio of silicone resin | | | Moisture | | | | |
| | Metal Powder | Silicone resin | Epoxy resin | | Viscosity | Phase difference | Permeation amount | | Elongation percentage | Specific resistance | Adhesion strength |
| | 3 | 1 | 1 | (%) | ratio | δ | [mg] | Rating | [%] | [μΩ*cm] | [MPa] |
|---|---|---|---|---|---|---|---|---|---|---|---|
| Example 9 | 100.0 | 18.0 | 0.0 | 100.0 | 9.3 | 60 | 7.7 | 5 | 0.31 | 157 | 3.1 |
| Example 10 | 100.0 | 17.1 | 0.9 | 95.0 | 9.9 | 58 | 13.4 | 5 | 0.31 | 159 | 3.2 |
| Example 11 | 100.0 | 16.2 | 1.8 | 90.0 | 10.8 | 56 | 31.2 | 4 | 0.31 | 160 | 3.3 |
| Example 12 | 100.0 | 14.4 | 3.6 | 80.0 | 12.2 | 54 | 56.4 | 3 | 0.32 | 165 | 3.5 |
| Example 13 | 100.0 | 13.0 | 5.0 | 72.2 | 13.0 | 51 | 73.4 | 3 | 0.36 | 170 | 3.8 |
| Comparative Example 1 | 100.0 | 12.0 | 6.0 | 66.7 | 14.4 | 50 | 125.6 | 2 | 0.39 | 182 | 3.9 |
| Comparative Example 2 | 100.0 | 9.0 | 9.0 | 50.0 | 15.9 | 49 | 105.9 | 2 | 0.34 | 209 | 4.4 |
| Comparative Example 3 | 100.0 | 6.0 | 12.0 | 33.3 | 21.2 | 46 | 100.1 | 2 | 0.36 | 222 | 4.7 |
| Comparative Example 4 | 100.0 | 0.0 | 18.0 | 0.0 | 40.3 | 40 | 323.3 | 1 | 0.38 | 493 | 5.0 |

Silicone resin content ratio: the content ratio (%) of the silicone resin to the total resin content in the conductive resin composition containing the silicone resin ((silicone resin/total resin content (silicone resin+resin other than silicone resin))×100)

From the results of Table 1 and Table 2, it was found that in Examples 1 to 13, since the conductive resin layer having a small moisture permeation amount was obtained and the adhesion strength required for the conductive resin layer was obtained, it was possible to manufacture an electronic component having high moisture resistance by using the conductive resin composition containing the silicone resin as compared with the case of using the conductive resin composition containing 33.3% by mass or more of the epoxy resin as the resin content.

Reference Example 14

A paste-like composition was obtained in the same manner as in Example 4. The obtained paste-like composition was diluted with benzyl alcohol to adjust the viscosity at 25° C. and a shear rate of 4 (1/s) to 30 Pa·s.

Next, the moisture permeability was evaluated in the same manner as described above except that the thickness in casting the conductive resin composition on the PET film was adjusted, and the film thickness of the cured film was as listed in Table 3. The results are shown in Table 3.

TABLE 3

| | Film thickness [μm] | Moisture permeation amount [mg] |
|---|---|---|
| Reference Example 14 | 23 | 16.4 |
| | 43 | 9.0 |
| | 75 | 3.0 |

Examples 15 to 26

As resin solid content, 135 parts by mass of the silicone resin 1 and 165 parts by mass of benzyl alcohol (manufactured by Godo Co., Ltd.) were mixed, and solvent-replacement was performed under the conditions of 130° C. and 30 Pa for 1 hour to obtain a resin solution. The obtained resin solution, the metal powder 1, and the metal powder 2, the silica powder 1, and the benzyl alcohol were mixed at a ratio listed in Tables 5 and 6, and then kneaded using a three-roll mill (manufactured by INOUE MFG., INC.) to obtain a paste-like composition.

The obtained composition was diluted with benzyl alcohol to adjust the viscosity at 25° C. and a shear rate of 4 (1/s) to 40 Pa·s, and then the above evaluation was performed. The results are shown in Tables 5 and 6.

Examples 27 to 31

As resin solid content, 135 parts by mass of the silicone resin 1 and 165 parts by mass of benzyl alcohol (manufactured by Godo Co., Ltd.) were mixed, and solvent-replacement was performed under the conditions of 130° C. and 30 Pa for 1 hour to obtain a resin solution. The obtained resin solution, the metal powder 1, and metal powder 2 were mixed at a ratio listed in Table 7, and then kneaded using a three-roll mill (manufactured by INOUE MFG., INC.) to obtain a paste-like composition.

The obtained composition was diluted with benzyl alcohol to adjust the viscosity at 25° C. and a shear rate of 4 (1/s) to 40 Pa·s, and then the above evaluation was performed. The results are shown in Table 7.

Examples 32 to 35

As resin solid content, 135 parts by mass of the silicone resin 1 and 165 parts by mass of benzyl alcohol (manufactured by Godo Co., Ltd.) were mixed, and solvent-replacement was performed under the conditions of 130° C. and 30 Pa for 1 hour to obtain a resin solution. The obtained resin solution, the metal powder 1, and the metal powder 2 were mixed at a ratio listed in Table 8, and then kneaded using a three-roll mill (manufactured by INOUE MFG., INC.) to obtain a paste-like composition.

The obtained composition was diluted with benzyl alcohol to adjust the viscosity at 25° C. and a shear rate of 4 (1/s) to 30 Pa·s, and then the above evaluation was performed. The results are shown in Table 8.

Evaluation of Applicability 1

<Manufacture of Multilayer Electronic Component>

As the electrode-forming body, a substantially rectangular parallelepiped laminated body as shown in FIG. 1 having a length of 3.2 mm, a width of 2.5 mm, and a height of 2.5 mm was prepared in which a plurality of dielectric layers containing barium titanate and a plurality of internal electrodes containing nickel were laminated.

A conductive resin composition containing copper powder was applied to both end surfaces of the laminated body by a dip method in the longitudinal direction being the vertical direction, and then the laminated body was held for 10 minutes under the conditions of 150° C. in an air atmosphere. Thereafter, in a nitrogen atmosphere, the temperature was increased to 780° C. at a temperature increase rate of 50° C./min. After reaching 780° C., the temperature was held for 15 minutes to form copper terminals.

The conductive resin composition shown in Table 4 or Table 8 was applied to the copper terminals formed on both end surfaces of the laminated body by a dip method in the longitudinal direction being the vertical direction, and the applied conductive resin composition was cured by being held for 60 minutes under the conditions of 200° C. in an air atmosphere to form a conductive resin layer on the copper terminals.

Furthermore, a nickel plating layer was formed on the conductive resin layer, and a tin plating layer was formed on the nickel plating layer, thereby producing a multilayer ceramic capacitor as a multilayer electronic component.

<Evaluation of Manufacturability>

A cross-section along the vertical direction of the multilayer electronic component was observed with a SEM, and the thickness of the conductive resin layer at a corner portion of an end surface of the laminated body (end surface corner thickness) and the thickness of the conductive resin layer at an end surface portion of the laminated body (end surface thickness) were measured. In the corner portion of the laminated body, the length of a portion having the shortest distance from the boundary between the plating layer and the conductive resin layer to the boundary between the conductive resin layer and the base layer (copper terminal) was defined as the end surface corner thickness. In addition, in the end surface portion of the laminated body, the length of a portion having the longest distance from the boundary between the conductive resin layer and the plating layer to the boundary between the conductive resin layer and the base layer (copper terminal) was defined as the end surface thickness when a perpendicular line was drawn from the boundary between the conductive resin layer and the plating layer toward the laminated body. Samples having an end surface corner thickness of less than 2.5 μm and/or an end surface thickness of more than 300 μm were evaluated as "rating: 1, unacceptable, unusable, and poor in manufacturability," samples having an end surface corner thickness of 5.0 μm or more and an end surface thickness of 200 μm or less were evaluated as 3, "rating: acceptable, usable, and excellent in manufacturability," and the other samples were evaluated as "rating: 2, acceptable, usable, and good in manufacturability." The results of the shape of the conductive resin layers were as shown in Table 4 or S.

Evaluation of Applicability 2

<Manufacture of Solid Electrolytic Capacitor>

As the electrode-forming body, a cathode-forming body composed of a substantially rectangular anode made of tantalum and having a length of 0.5 mm, a width of 3.7 mm and a height of 5.4 mm, and a dielectric layer made of tantalum pentoxide formed on the surface of the anode were prepared.

After the solid electrolyte layer was formed on the cathode-forming body and the carbon layer was formed on the solid electrolyte layer, the conductive resin composition shown in Table 5 or 6 was applied on the carbon layer by a dip method in the height direction being the vertical direction, and the applied conductive resin composition was cured by being held for 60 minutes under the conditions of 170° C. in the air atmosphere to form a conductive resin layer.

Thereafter, it was connected to a terminal, and a resin outer layer was formed by a resin molding method to produce a tantalum capacitor as a solid electrolytic capacitor.

<Evaluation of Manufacturability>

The horizontal cross section of the solid electrolytic capacitor was observed with an SEM, and the thickness of the conductive resin layer at the corner portion of the side surface of the cathode-forming body (side surface corner thickness) and the thickness of the conductive resin layer at the side surface portion of the cathode-forming body (side surface thickness) were measured. In the corner portion of the cathode-forming body, the length of the portion having the shortest distance from the boundary between the resin outer layer and the conductive resin layer to the boundary between the conductive resin layer and the base layer (cathode-forming body) was defined as the side corner thickness. In addition, in the side surface portion of the cathode-forming body, the length of the portion having the longest distance from the boundary between the resin outer layer and the conductive resin layer to the boundary between the conductive resin layer and the base layer (cathode-forming body) was defined as the side surface thickness. Samples having a side surface corner thickness of 5 μm or more and 20 μm or less were evaluated as "rating: 3, acceptable, usable, and excellent in manufacturability," samples having a side surface corner thickness of less than 2.5 μm and/or a side surface thickness of more than 40 μm were evaluated as "rating: 1, unacceptable, unusable, and poor in manufacturability," and the other samples were evaluated as "rating: 2, acceptable, usable, and good in manufacturability." The results of the shape of the conductive resin layers were as shown in Table 5 or 6.

Evaluation of Applicability 3

<Formation of Conductive Resin Layer by Screen Printing>

An alumina substrate (1 inch square) was prepared. On this substrate, the conductive composition shown in Table 7 was screen-printed with a line width of 150 μm, and the printed conductive composition was cured by being held for 60 minutes under the conditions of 200° C. in an air atmosphere to form a conductive resin layer.

<Evaluation of Shape of Conductive Resin Layer>

After the formation of the conductive resin layer, samples having good shape without bleeding or thin spots were evaluated as "rating: 3, acceptable, usable, and excellent in formability," samples having slight bleeding or thin spots but being useable were evaluated as "rating: 2, acceptable, usable", and samples having remarkable bleeding or thin spots and being unusable were evaluated as "rating: 1, unacceptable, unusable, and poor in formability." The results of the shape of the conductive resin layers were as shown in Table 7.

TABLE 4

| | | Content (parts by mass) | | | | | |
| Test No. | Conductive composition | Metal Powder 1 | Metal Powder 2 | Silicone Resin | Viscosity ratio | Phase difference δ | Shape (Rating) |
|---|---|---|---|---|---|---|---|
| 1 | Example 1 | 40.0 | 60.0 | 3.0 | 23.2 | 43 | 1 |
| 2 | Example 2 | 40.0 | 60.0 | 5.0 | 16.4 | 45 | 2 |
| 3 | Example 3 | 40.0 | 60.0 | 8.0 | 11.3 | 50 | 3 |
| 4 | Example 4 | 40.0 | 60.0 | 12.0 | 7.2 | 67 | 3 |
| 5 | Example 5 | 40.0 | 60.0 | 18.0 | 3.0 | 72 | 3 |
| 6 | Example 6 | 40.0 | 60.0 | 21.0 | 2.1 | 80 | 3 |
| 7 | Example 7 | 40.0 | 60.0 | 25.0 | 1.5 | 87 | 2 |
| 8 | Example 8 | 40.0 | 60.0 | 30.0 | 1.2 | 89 | 3 |

TABLE 5

| | | Content (parts by mass) | | | | | | Moisture Permeation amount | | | | | |
| Test No. | Conductive composition | Metal Powder 1 | Metal Powder 2 | Silicon Resin 1 | Silica powder 1 | Viscosity ratio | Phase difference δ | [mg] | Rating | Elongation percentage [%] | Specific resistance [μΩ*cm] | Adhesion strength [MPa] | Shape (Rating) |
|---|---|---|---|---|---|---|---|---|---|---|---|---|---|
| 9 | Example 15 | 40.0 | 60.0 | 5.0 | 3.0 | 54.9 | 32 | 74.2 | 3 | 0.24 | 880 | 2.1 | 2 |
| 11 | Example 16 | 40.0 | 60.0 | 5.0 | 2.0 | 47.1 | 37 | 27.7 | 4 | 0.23 | 652 | 2.3 | 3 |
| 13 | Example 17 | 40.0 | 60.0 | 5.0 | — | 23.2 | 41 | 8.9 | 5 | 0.28 | 23 | 2.8 | 3 |
| 14 | Example 18 | 40.0 | 60.0 | 8.0 | — | 14.1 | 47 | 12.2 | 5 | 0.31 | 21 | 3.9 | 3 |
| 15 | Example 19 | 40.0 | 60.0 | 12.0 | — | 9.8 | 62 | 9.1 | 5 | 0.32 | 28 | 6.1 | 3 |
| 16 | Example 20 | 40.0 | 60.0 | 18.0 | — | 5.6 | 68 | 6.7 | 5 | 0.38 | 56 | 8.1 | 3 |
| 17 | Example 21 | 40.0 | 60.0 | 21.0 | — | 3.4 | 73 | 4.5 | 5 | 0.44 | 189 | 9.8 | 3 |
| 18 | Example 22 | 40.0 | 60.0 | 25.0 | — | 2.7 | 80 | 2.2 | 5 | 0.48 | 432 | 8.9 | 2 |
| 19 | Example 23 | 40.0 | 60.0 | 30.0 | — | 1.4 | 88 | 3.1 | 5 | 0.50 | 864 | 9.4 | 1 |

TABLE 6

| | Metal Powder | Silicone Resin | Viscosity | Phase difference | Moisture Permeation amount | | Shape |
|---|---|---|---|---|---|---|---|
| | 2 | 1 | ratio | δ | [mg] | Rating | (Rating) |
| Example 24 | 100.0 | 18.0 | 9.6 | 58 | 7.5 | 5 | 3 |
| Example 25 | 100.0 | 30.0 | 3.5 | 70 | 5.4 | 5 | 3 |
| Example 26 | 100.0 | 35.0 | 1.6 | 96 | 3.1 | 5 | 2 |

| | | Content (parts by mass) | | | | | Moisture | | |
|---|---|---|---|---|---|---|---|---|---|
| Test | Conductive | Metal Powder | Metal Powder | Silicone Resin | Viscosity | Phase difference | Permeation amount | | Shape |
| No. | composition | 1 | 2 | 1 | ratio | δ | [mg] | Rating | (Rating) |
| 20 | Example 27 | 40.0 | 60.0 | 3.0 | 23.2 | 43 | 8.9 | 5 | 2 |
| 21 | Example 28 | 40.0 | 60.0 | 5.0 | 16.4 | 45 | 2.5 | 5 | 3 |
| 22 | Example 29 | 40.0 | 60.0 | 8.0 | 11.3 | 50 | 5.8 | 5 | 3 |
| 23 | Example 30 | 40.0 | 60.0 | 18.0 | 3.0 | 72 | 4.6 | 5 | 3 |
| 24 | Example 31 | 40.0 | 60.0 | 28.0 | 1.4 | 88 | 2.7 | 5 | 2 |

| | Content (parts by mass) | | | Moisture | | | | | |
|---|---|---|---|---|---|---|---|---|---|
| | Metal Powder | Metal Powder | Silicone Resin | Permeation amount | | Elongation percentage | Specific resistance | Adhesion strength | Shape |
| | 1 | 2 | 1 | [mg] | Rating | [%] | [μΩ*cm] | [MPa] | (Rating) |
| Example 32 | 100.0 | 0.0 | 12.0 | 7.6 | 5 | 0.29 | 382 | 8.7 | 1 |
| Example 33 | 80.0 | 20.0 | 12.0 | 3.2 | 5 | 0.28 | 112 | 6.2 | 2 |
| Example 34 | 60.0 | 40.0 | 12.0 | 2.1 | 5 | 0.26 | 51 | 4.5 | 3 |
| Example 35 | 40.0 | 60.0 | 12.0 | 3.6 | 5 | 0.26 | 42 | 3.5 | 3 |

60 minutes, resulting in a cured film; cutting the cured film into a circle 7.5 mm in diameter; fixing the cured film with an adhesive so as to cover a 5-ml glass bottle containing 2 grams of silica gel; placing the glass bottle in a 750-ml vessel containing 100 ml of purified water so that the cured film does not come into contact with the purified water; sealing and placing the 750-ml vessel in a dryer at 65° C. to be left for 15 hours; measuring a weight of the glass bottle before and after the glass bottle is placed in the dryer; and defining a weight increase thereof as the moisture permeation amount,

The invention claimed is:

1. A method for manufacturing an electronic component, comprising:

a preparation step of preparing an electrode-forming body for electronic components; and an electrode forming step of forming an electrode on an outer surface of the electrode-forming body for electronic components, wherein a conductive resin layer is formed on the electrode-forming body for electronic components by applying a conductive resin composition containing a thermosetting silicone resin and a metal powder to the electrode-forming body for electronic components and then curing thermally the conductive resin composition, wherein the conductive resin layer has a thickness of 2.5 μm or more, wherein a moisture permeation amount is 40.0 mg or more as determined by casting the conductive resin composition on a PET film to a thickness of 250 μm; curing the conductive resin composition under at 200° C. for wherein the electrode-forming body for electronic components has at least one end surface portion, wherein a corner portion is an outer circumferential part of the end surface portion, where the end surface portion connects to a surface different from the end surface portion, and wherein the conductive resin layer is formed by applying the conductive resin composition so as to cover at least the corner portion in the electrode forming step, and wherein a content of a resin component in the conductive resin composition containing the thermosetting silicone resin is 2.5 to 35.0 parts by mass with respect to 100.0 parts by mass of the metal powder, and wherein the thermosetting silicone resin has a hydroxy group and is cured by heating without using a curing agent.

2. The method according to claim 1, wherein: when a 1% strain is applied to the conductive resin composition at an angular frequency of 1 Hz, a value of a phase difference δ between the strain and a stress caused by the strain is in a range of 32 to 88°; and/or a ratio of a viscosity of the conductive resin composition at a shear rate of 0.4 (1/s) to a viscosity thereof at a shear rate of 40 (1/s) is in a range of 1.4 to 60.0.

3. The method according to claim 2, wherein when the conductive resin composition is cast on a slide glass substrate to a thickness of 50 μm, cured by placing an aluminum cylinder having a diameter of 3 mm thereon under the conditions of 200° C. for 60 minutes, and pulled in the vertical direction at a rate of 0.5 mm/s using a bond tester, a value at break is 2.1 MPa or more.

4. The method according to claim 1, wherein when the conductive resin composition is cast on a slide glass substrate to a thickness of 50 μm, cured by placing an aluminum cylinder having a diameter of 3 mm thereon under the conditions of 200° C. for 60 minutes, and pulled in the vertical direction at a rate of 0.5 mm/s using a bond tester, a value at break is 2.1 MPa or more.

5. The method for manufacturing an electronic component according to claim 1, wherein the thermosetting silicone resin is cured through a dehydration reaction upon heating.

6. The method for manufacturing an electronic component according to claim 5, wherein when the conductive resin composition is cast on a slide glass substrate to a thickness of 50 μm, cured by placing an aluminum cylinder having a diameter of 3 mm thereon under the conditions of 200° C. for 60 minutes, and pulled in the vertical direction at a rate of 0.5 mm/s using a bond tester, a value at break is 2.1 MPa or more.

7. The method for manufacturing an electronic component according to claim 1, wherein the thermosetting silicone resin has an epoxy group.

8. The method for manufacturing an electronic component according to claim 1, wherein the metal powder comprises a flaky metal powder, and a content ratio of the flaky metal powder to the metal powder is 20.0% by mass or more.

9. The method for manufacturing an electronic component according to claim 1, wherein the metal powder contains at least one or more powders selected from: one or more powders of silver, copper, nickel, palladium, platinum, gold, and aluminum; a powder containing an alloy of one or more of these metals; a silver-coated copper powder; and a silver-coated nickel powder.

10. The method for manufacturing an electronic component according to claim 1, wherein the metal powder comprises a flaky metal powder, and the flaky metal powder has: an aspect ratio of 1.5 to 50.0; a number average particle diameter of 0.1 to 20.0 μm as measured using a scanning electron microscope (SEM); and a specific surface area of 0.5 to 5.0 $m^2$/g.

11. The method for manufacturing an electronic component according to claim 1, wherein the metal powder comprises a spherical metal powder, a content ratio of the spherical metal powder to the entire metal powder is 80.0% by mass or less, and a content of the flaky metal powder with respect to the entire metal powder is 20.0% by mass or more.

12. The method for manufacturing an electronic component according to claim 11, wherein the metal powder comprises a spherical metal powder, and the spherical metal powder has: a volume-based cumulative 50% particle diameter ($D_{50}$) of 0.01 to 7.0 μm; and a specific surface area of 0.2 to 3.0 $m^2$/g.

13. The method for manufacturing an electronic component according to claim 1, wherein a content ratio of the thermosetting silicone resin to a total resin component ((silicone resin/total resin)×100) is 70.0% by mass or more in the conductive resin composition containing the thermosetting silicone resin.

* * * * *